United States Patent
Kaneda et al.

(10) Patent No.: US 10,081,285 B2
(45) Date of Patent: Sep. 25, 2018

(54) VEHICLE SEAT

(71) Applicant: TOYOTA BOSHOKU KABUSHIKI KAISHA, Aichi-ken (JP)

(72) Inventors: Koji Kaneda, Aichi-ken (JP);
Fumitoshi Akaike, Aichi-ken (JP);
Komei Yano, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/417,802

(22) Filed: Jan. 27, 2017

(65) Prior Publication Data
US 2017/0217341 A1    Aug. 3, 2017

(30) Foreign Application Priority Data

Feb. 1, 2016 (JP) ................................ 2016-016959

(51) Int. Cl.
| | |
|---|---|
| *B60N 2/90* | (2018.01) |
| *B60N 2/20* | (2006.01) |
| *B60N 2/22* | (2006.01) |
| *B60N 2/64* | (2006.01) |
| *B60N 2/66* | (2006.01) |

(52) U.S. Cl.
CPC ............... *B60N 2/99* (2018.02); *B60N 2/20* (2013.01); *B60N 2/2222* (2013.01); *B60N 2/643* (2013.01); *B60N 2/66* (2013.01)

(58) Field of Classification Search
CPC .......... B60N 2/99; B60N 2/4492; B60N 2/20; B60N 2/2222
USPC ............................................. 297/284.9, 284.3
See application file for complete search history.

(56) References Cited

U.S. PATENT DOCUMENTS

| | | | | |
|---|---|---|---|---|
| 3,608,960 A | * | 9/1971 | Sherman ................. | A47C 7/46 297/284.9 |
| 4,370,000 A | * | 1/1983 | Kazaoka ................ | B60N 2/449 297/284.9 |
| 4,537,444 A | * | 8/1985 | Maruyama .............. | A47C 7/46 297/284.9 |
| 4,636,000 A | * | 1/1987 | Nishino ............... | B60N 2/4492 297/284.9 |
| 4,707,027 A | * | 11/1987 | Horvath ................ | B60N 2/914 297/284.6 |
| 5,407,248 A | * | 4/1995 | Jay ........................ | A61G 5/10 297/284.1 |
| 7,140,680 B2 | * | 11/2006 | McMillen ............... | B60N 2/20 297/284.9 |
| 7,140,681 B2 | * | 11/2006 | McMillen .............. | B60N 2/449 297/284.9 |
| 7,422,285 B2 | * | 9/2008 | Phipps ................... | B60N 2/976 297/284.1 |

(Continued)

FOREIGN PATENT DOCUMENTS

JP    2008-540224    11/2008

*Primary Examiner* — Jose V Chen
(74) *Attorney, Agent, or Firm* — Greenblum & Bernstein, P.L.C.

(57) ABSTRACT

A vehicle seat includes a main part that forms a center portion of a front surface of a seatback; bolster parts that form side parts of the front surface of the seatback; and a reclining adjuster configured to adjust a backrest angle of the seatback, and to move a lower area of the main part toward a front side relative to the bolster parts as the main part is reclined.

7 Claims, 15 Drawing Sheets

(56) References Cited

U.S. PATENT DOCUMENTS

| | | | | |
|---|---|---|---|---|
| 7,914,471 B2* | 3/2011 | Chen | ............ | A61H 23/0263 |
| | | | | 297/284.9 |
| 8,016,350 B2* | 9/2011 | Dellanno | ............ | B60N 2/888 |
| | | | | 297/216.12 |
| 8,020,933 B2* | 9/2011 | Kim | ............ | B60N 2/66 |
| | | | | 297/284.8 |
| 8,109,571 B2* | 2/2012 | Chen | ............ | B60N 2/2821 |
| | | | | 297/250.1 |
| 2002/0089220 A1* | 7/2002 | Achleitner | ............ | B60N 2/449 |
| | | | | 297/284.9 |
| 2007/0069563 A1* | 3/2007 | Herzog | ............ | A47C 9/002 |
| | | | | 297/284.3 |
| 2008/0136237 A1* | 6/2008 | Kayumi | ............ | B60N 2/99 |
| | | | | 297/284.9 |
| 2009/0284059 A1* | 11/2009 | Gupta | ............ | B60N 2/0224 |
| | | | | 297/284.9 |
| 2010/0030435 A1* | 2/2010 | Hattori | ............ | B60N 2/0244 |
| | | | | 701/49 |
| 2010/0117412 A1* | 5/2010 | Bicker | ............ | B60N 2/809 |
| | | | | 297/217.1 |
| 2014/0203603 A1* | 7/2014 | Line | ............ | B60N 2/64 |
| | | | | 297/218.1 |
| 2014/0361590 A1* | 12/2014 | Line | ............ | B60N 2/0244 |
| | | | | 297/284.9 |
| 2015/0231998 A1* | 8/2015 | Beier | ............ | B60N 2/4492 |
| | | | | 297/284.9 |
| 2017/0008480 A1* | 1/2017 | Ohno | ............ | B60N 2/4279 |
| 2017/0217341 A1* | 8/2017 | Kaneda | ............ | B60N 2/99 |
| 2017/0297460 A1* | 10/2017 | Akaike | ............ | B60N 2/4492 |
| 2018/0022246 A1* | 1/2018 | Patrick | ............ | B60N 2/4415 |
| | | | | 297/284.3 |

* cited by examiner

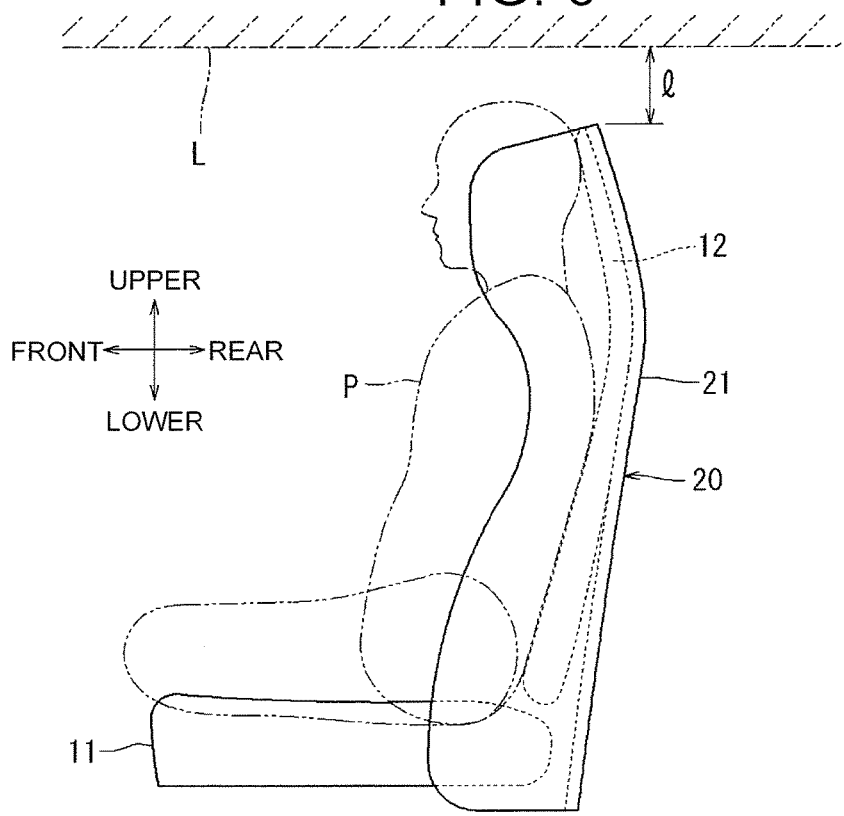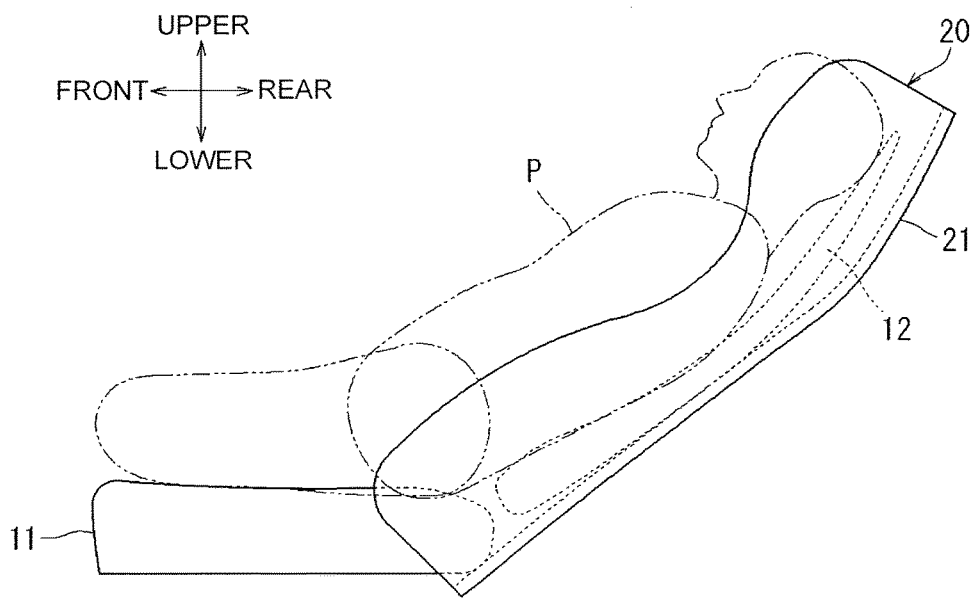

VEHICLE SEAT

INCORPORATION BY REFERENCE

The disclosure of Japanese Patent Application No. 2016-016959 filed on Feb. 1, 2016 including the specification, drawings and abstract is incorporated herein by reference in its entirety.

BACKGROUND

1. Technical Field

The disclosure relates to a vehicle seat. More specifically, the disclosure relates to a vehicle seat including a main part, which forms a center portion of a front surface of a seatback, and bolster parts, which form side parts of the front surface of the seatback.

2. Description of Related Art

There is a conventionally-known vehicle seat including a main part of a seatback, and bolster parts provided on both sides of the main part to protrude and bulge toward the front side, the main part and bolster parts being constituted by structures separate from each other (Published Japanese Translation of PCT application No. 2008-540224 (JP-A-2008-540224)).

SUMMARY

In the above related art, the main part, and the bolster parts protruding on both sides of the main part move integrally with each other when the seatback is reclined. Therefore, when the seatback is reclined, due to gravity, arms of a seated occupant lean against protruding side areas of both of the bolster parts, and an occupant may feel that the width of the backrest surface is narrow, and may have a feeling of being cramped.

The disclosure makes it possible to alleviate a feeling of being cramped due to protrusion of bolster parts when the seatback is reclined.

An aspect of the disclosure relates to a vehicle seat including a main part that forms a center portion of a front surface of a seatback; bolster parts that form side parts of the front surface of the seatback; and a reclining adjuster configured to adjust a backrest angle of the seatback, and to move a lower area of the main part toward a front side relative to the bolster parts as the main part is reclined.

According to the above aspect, when the seatback is reclined, the lower area of the main part is moved toward the front side relative to the bolster parts as the main part is reclined. Therefore, even when the bolster parts are configured to protrude and bulge toward the front side so as to form so-called side supports, the bolster parts are less protruded when the seatback is reclined, and it is thus possible to alleviate a feeling of being cramped due to the protrusion of the bolster parts.

In the above aspect, the reclining adjuster may be configured to operate the main part and the bolster parts independently of each other.

In the above structure, relative movements of the main part and the bolster parts can be realized by a combination of individual small or individual simple movements.

In the above aspect, the reclining adjuster may include a main reclining mechanism configured to adjust a backrest angle of the main part, and a side reclining mechanism configured to adjust a backrest angle of the bolster parts; and the main part and the bolster parts may be operated independently of each other by the main reclining mechanism and the side reclining mechanism, respectively.

In the above structure, the reclining adjuster has a simple structure constituted by a combination of the main reclining mechanism that adjusts the backrest angle of the main part, and the side reclining mechanism that adjusts the backrest angle of the bolster parts.

In the above aspect, the main reclining mechanism and the side reclining mechanism may be configured to change the backrest angles by rotating about rotation centers that are set independently of each other; and the rotation center of the main reclining mechanism may be set at a position that is closer to a hip point of a seated occupant than the rotation center of the side reclining mechanism is.

In the above structure, the bolster parts are reclined about the rotation center that is farther from the hip point than the rotation center of the main part is. Therefore, it is possible to move the bolster parts in the reclining direction more efficiently than the main part, and the lower area of the main part is easily moved toward the front side relative to the bolster parts.

In the above aspect, the rotation center of the main reclining mechanism and the rotation center of the side reclining mechanism may be set at positions such that a distance between the main part and the bolster parts increases as a reclining angle of each of the main part and the bolster parts increases.

In the above structure, it is possible to move the bolster parts in the reclining direction more efficiently than the main part, and the lower area of the main part is easily moved toward the front side relative to the bolster part.

In the above aspect, the rotation center of the main reclining mechanism and the rotation center of the side reclining mechanism may be set at positions such that positions of the bolster parts relative to the main part in a rotation radius direction are moved up as a reclining angle of each of the main part and the bolster parts increases.

In the above structure, as the main part and the bolster parts are reclined, the bolster parts move relatively to the main part toward the side of the head part of the seat back, which is the outer side of the rotation radius. Therefore, this structure can be applied in order to improve comfort at the time of reclining. That is, for example, side support-shaped portions provided in the bolster parts may be brought to both sides of the seated occupant's head as the seatback is reclined.

In the above aspect, the rotation center of the main reclining mechanism may be set at the position that is lower than and behind the hip point of the seated occupant, and the rotation center of the side reclining mechanism may be set at a position that is lower than and behind the rotation center of the main reclining mechanism.

In the above structure, the main reclining mechanism and the side reclining mechanism are operated optimally in accordance with their reclining operations, respectively, such that the bolster parts are less protruded.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a side view of the embodiment and shows a state where a seating posture is in a normal mode;

FIG. 6 is a side view of the embodiment and shows a state where a seating posture is in a relaxed mode;

DETAILED DESCRIPTION OF EMBODIMENTS

Figure 1:
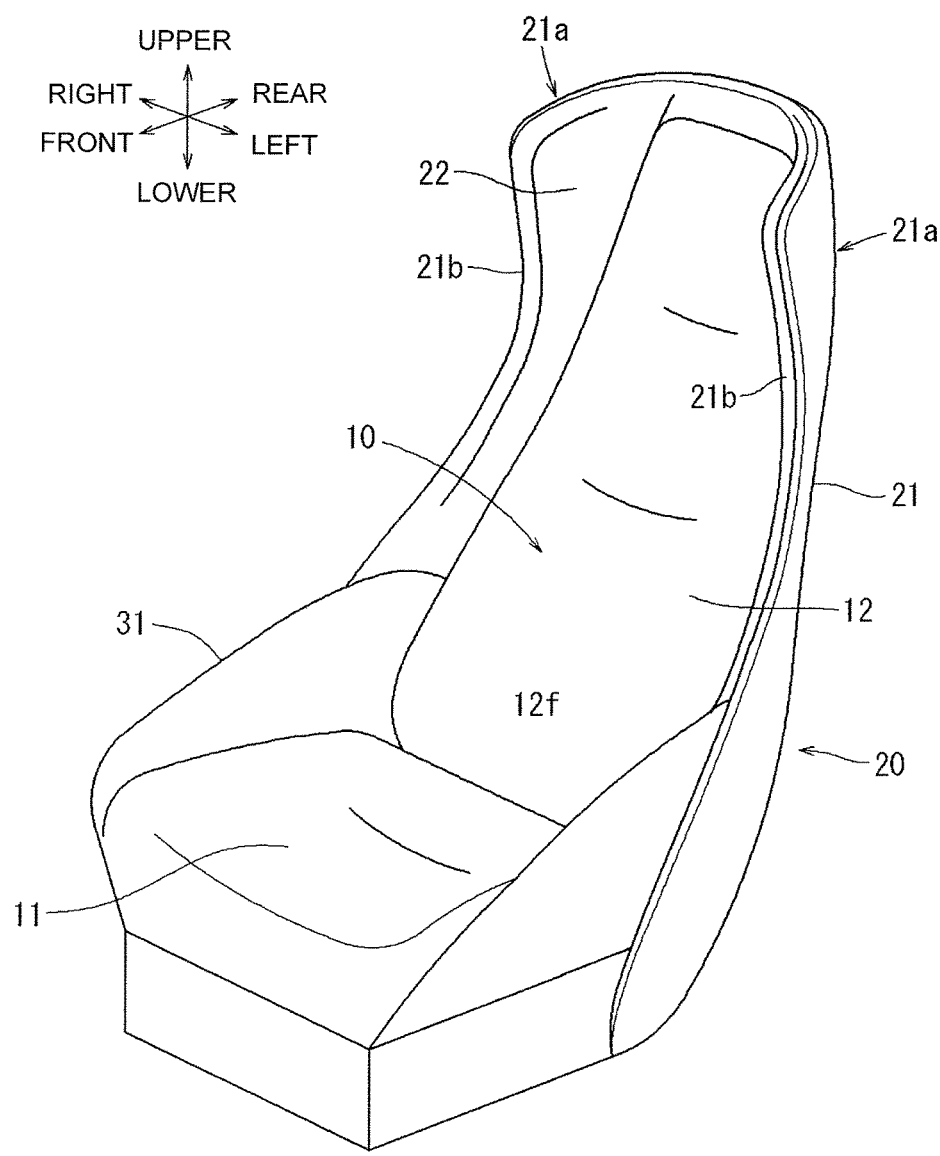
FIG. 1 is a perspective view of an embodiment of the disclosure, showing a state where a shell part is not separated from and integrated with a seating part.
Figure 2:
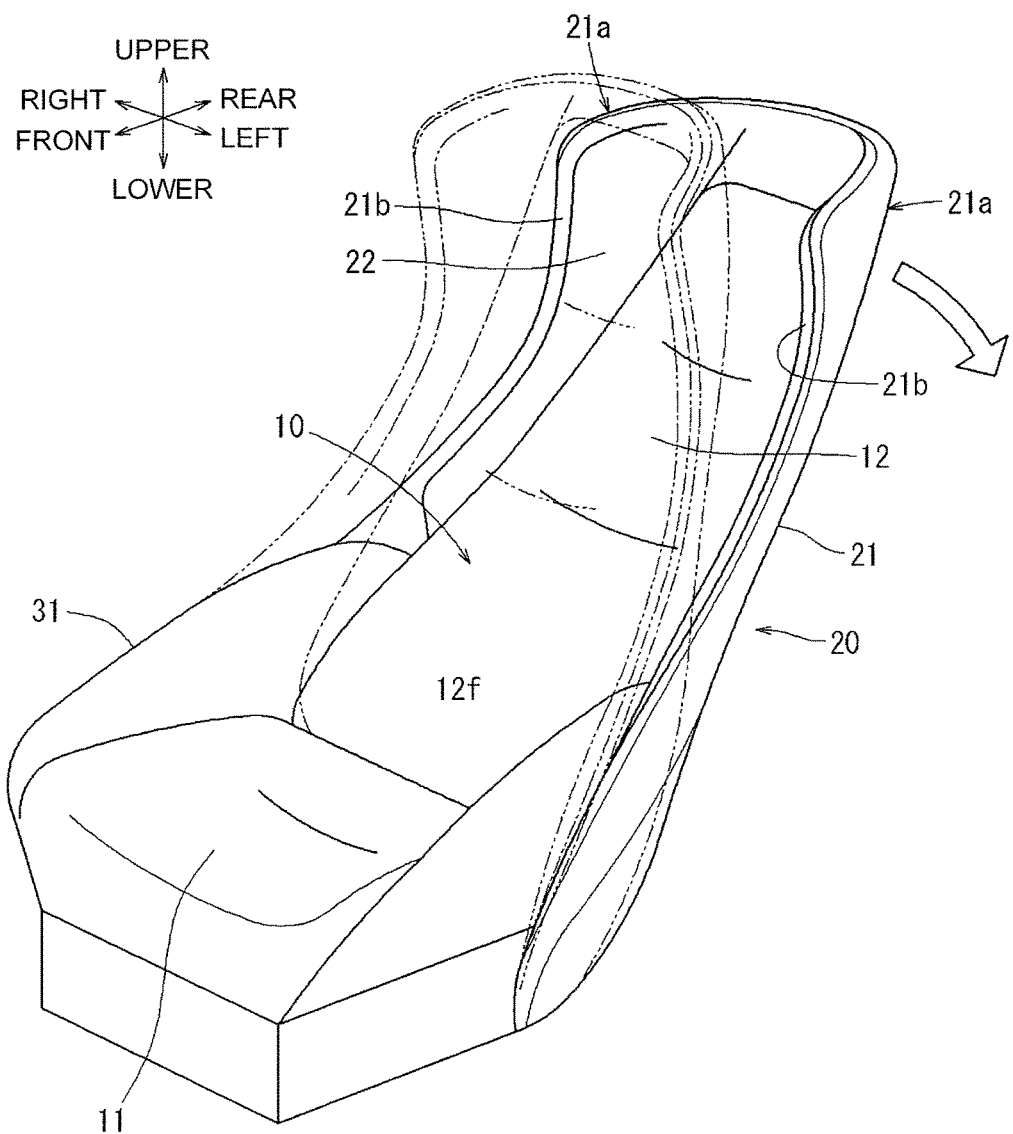
FIG. 2 is a perspective view similar to FIG. 1 and shows a state where a seatback part of a seating part is inclined backward while the shell part is not separated from and integrated with the seating part.
Figure 3:
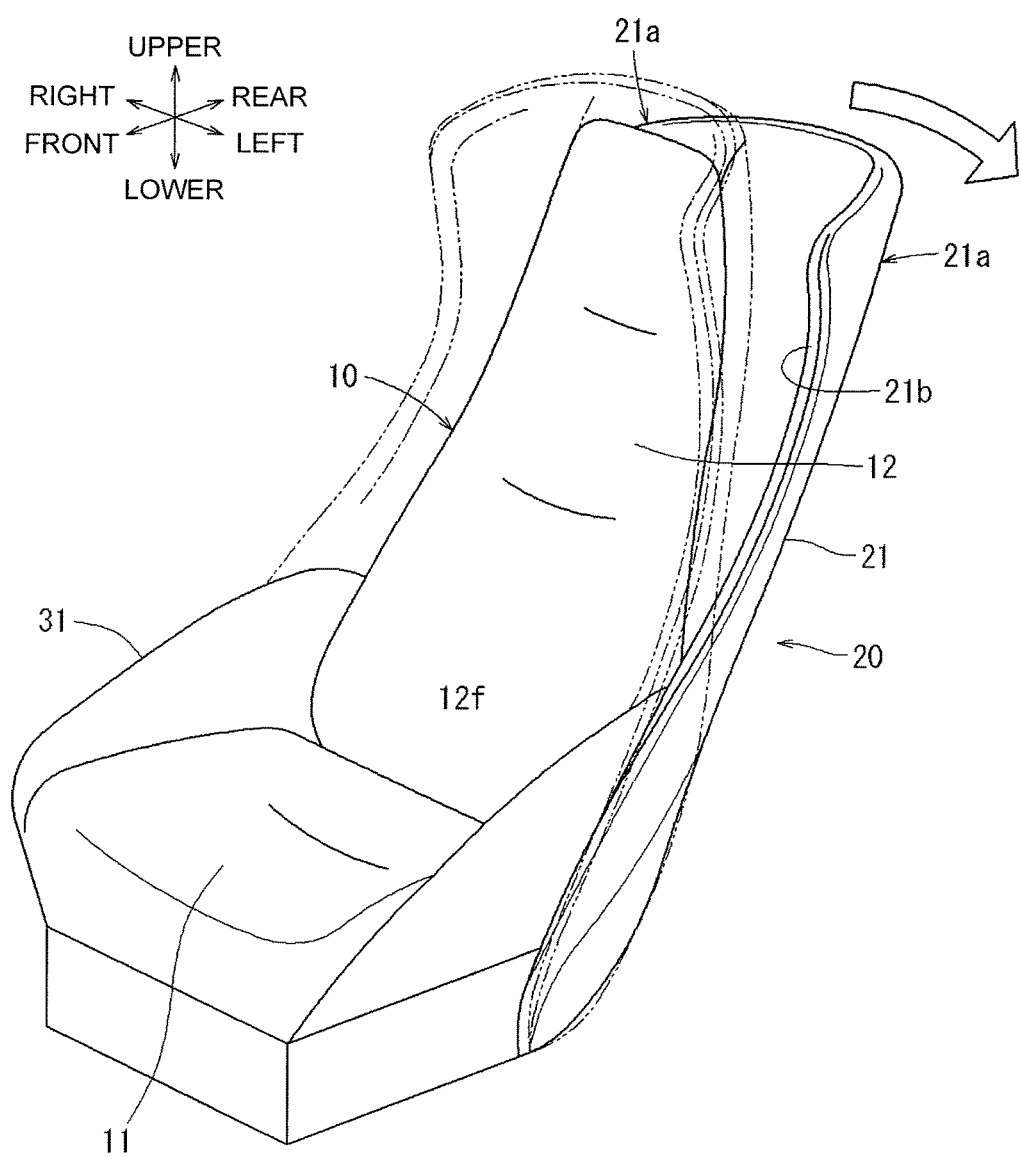
FIG. 3 is a perspective view similar to FIG. 1 and shows a state where the shell part is separated from the seating part.

FIG. 1 to FIG. 3 show an exterior appearance of a vehicle seat according to an embodiment of the disclosure. This seat is a shell-type seat that gives a seated occupant a sense of personal space, and both sides of a seating part 10 is covered by a shell part 20. Here, the seat includes the seating part 10 and the shell part 20 that are configured as separate bodies from each other. In the explanation below, directions are described based on directions as viewed from an occupant seated on the seat.

The seating part 10 that supports an occupant in a seating posture includes a seat cushion part 11 and a seatback part 12. The seat cushion part 11 forms a seating part under a lower part of the occupant, and the seatback part 12 forms a backrest on the back of the occupant. As described later, the seatback part 12 is disposed behind the seat cushion part 11 and a rearward inclination angle of the seatback part 12 with respect to the seat cushion part 11 is adjustable by a first reclining mechanism. As in a general vehicle seat, the seat cushion part 11 and the seatback part 12 are configured by disposing an urethane pad serving as an elastic material on a frame serving as a framework member and covering the urethane pad with a seat cover serving as a covering material. The seat cushion part 11 may be configured so as to be moved in the front-rear and lateral directions on a floor on which the seat is installed, by using a front-rear slide rail and a lateral slide rail.

The shell part 20 covers an area of the seating part 10 from the rear to the side parts of the seating part 10. Specifically, the shell part 20 includes an upper shell 21 and an under shell 31. The upper shell 21 is arranged behind the seating part 10 including the seat cushion part 11 and the seatback part 12, and the under shell 31 is arranged on both side parts of the seating part 10. The under shell 31 is fixed to the seat cushion part 11. The upper shell 21 is fixed to the seat cushion part 11 through a second reclining mechanism as described later, and it is possible to adjust a rearward inclination angle of the upper shell 21 with respect to the seat cushion part 11.

Each of the upper shell 21 and the under shell 31 is formed by integrated resin molding, and a frame serving as a framework member is incorporated in a resin molded article as an insert material for insert molding. Further, in the resin molded articles that form the upper shell 21 and the under shell 31, an elastic body 22 is provided on the sides that face the seated occupant. The elastic body 22 is made of a urethane pad serving as an elastic material, and a covering material that covers the surface of the urethane pad.

Various shapes and structures may be employed as the shape and structure of the shell part 20 including the upper shell 21 and the under shell 31, depending on design ideas of the seat. The seat according to this embodiment is a shell-type seat that provides a sense of personal space, and the shell part 20 has a shape and structure that give a seated occupant a sense of personal space. When it is desired to form the seat as a sport seat, the shell part 20 may have shape and structure like a bucket seat.

Figure 7:
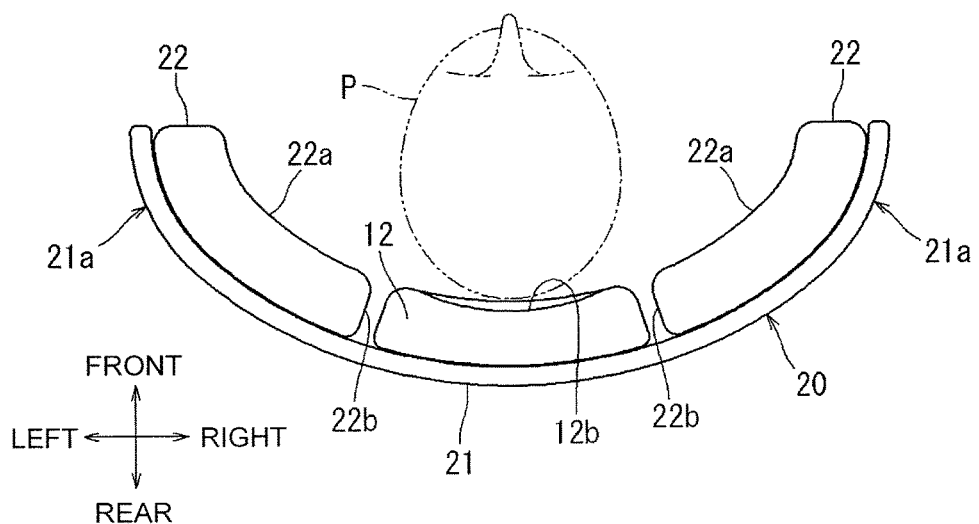
FIG. 7 is a plan view of the embodiment and shows a state where the shell part is not separated from and integrated with the seating part.

As described above, rearward inclination angles of the seatback part 12 and the upper shell 21 are adjustable separately from each other with respect to the seat cushion part 11. Therefore, as shown in FIG. 1 and FIG. 2, rearward inclination angles of the seatback part 12 and the upper shell 21 are adjustable with respect to the seat cushion part 11 in a state where the seatback part 12 and the upper shell 21 are overlapped with each other in the front-rear direction and integrated with each other (see FIG. 5 and FIG. 6). In this state, as shown in FIG. 7, while the back of the seated occupant P is supported by the seatback part (corresponding to a "main part" of the disclosure) 12, both side portions of the seated occupant P are covered by both side parts of the upper shell 21 (corresponding to "bolster parts" of the disclosure) 21a. Therefore, the occupant P is given a sense of personal space.

Figure 8:
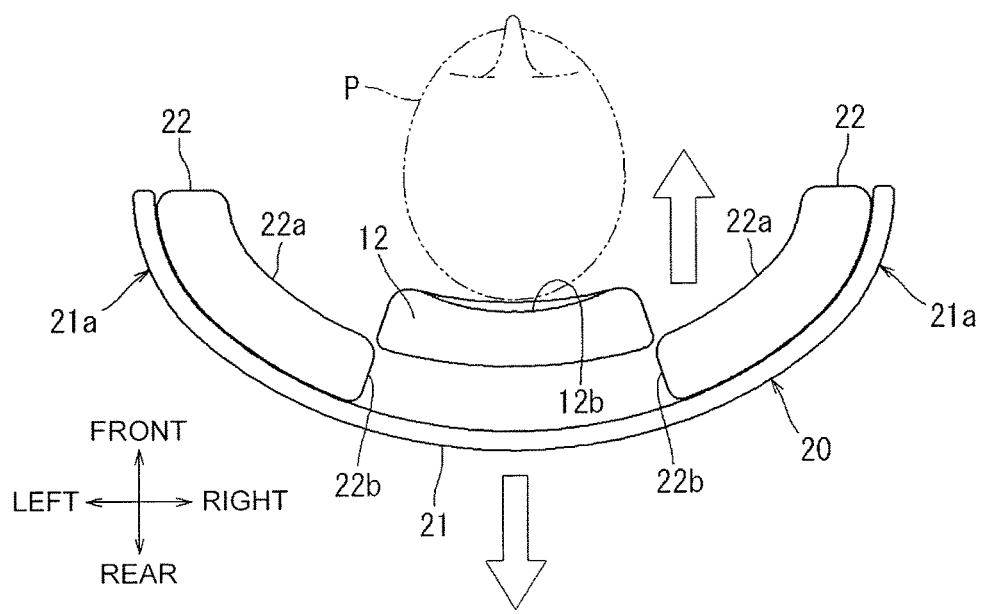
FIG. 8 is a plan view similar to FIG. 7 and shows a state where the shell part is separated from the seating part.

Also, as shown in FIG. 3 and FIG. 8, it is possible to separate the upper shell 21 from the seatback part 12. In this state, both sides of an upper part of the seated occupant P's body are not covered or less covered by both side parts 21a of the upper shell 21, the occupant P is able to have a sense of openness without having a feeling of being closed or pressed.

As shown in FIG. 7, a seating surface of the seatback part 12 that supports the seated occupant P is made of a curved surface 12b that is depressed on the side where the occupant P is seated and has a shape that encloses the back of the seated occupant P from the rear and sides. In a state where the shell part 20 is overlapped with the seating part 10 in the front-rear direction and integrated with the seating part 10, the occupant P side of the elastic body 22 of the upper shell 21 is constituted by a curved surface 22a that is continuous with the curved surface 12*b* of the seatback part 12, and extends from the curved surface 12*b* to the sides.

Therefore, as shown in FIG. 8, in a state where the shell part 20 is separated from the seating part 10, the back of the occupant P is supported stably by the curved surface 12*b* of the seatback part 12. Also, as shown in FIG. 7, in the state where the shell part 20 is overlapped with the seating part 10 in the front-rear direction and integrated with the seating part 10, the curved surface 12*b* of the seatback part 12 is connected with the curved surface 22*a* of the elastic body 22 of the upper shell 21 such that the surface that receives the back of the occupant P is expanded (see FIG. 4). Therefore, a large space is ensured around the occupant P and thus the occupant P is able to take a relaxed posture.

Figure 9:
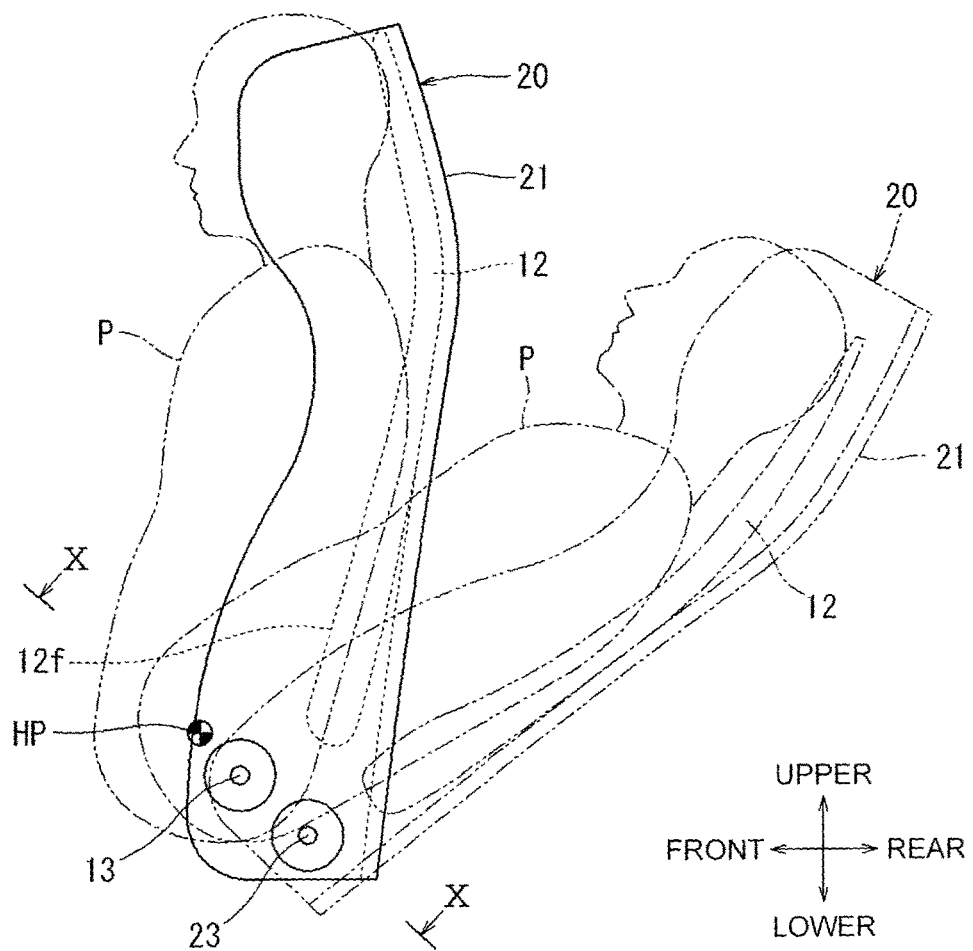
FIG. 9 is a view illustrating an operation in the embodiment and shows an operation for adjusting an inclined angle of the seatback part of the seating part.

As shown in FIG. 9, a first reclining mechanism (corresponding to a "main reclining mechanism (reclining adjuster)" of the disclosure) 13 is able to adjust a rearward inclination angle of the seatback part 12 with respect to the seat cushion part 11. Also, a second reclining mechanism (corresponding to a "side reclining mechanism (reclining adjuster)" of the disclosure) 23 is able to adjust a rearward inclination angle of the upper shell 21 with respect to the seat cushion part 11. The rotation center of the second reclining mechanism 23 is arranged so as to be separated from a hip point HP of the seated occupant P to a lower rear side. In other words, the rotation center of the second reclining mechanism 23 is positioned in the fourth quadrant in plane coordinates in which the horizontal axis and the vertical axis intersect at the hip point HP. Further, the rotation center of the first reclining mechanism 13 is disposed closer to the hip point HP of the seated occupant P than the rotation center of the second reclining mechanism 23 is.

As a result, because the hip point HP, which is the center of pivot of the upper part of the occupant P's body, and the center of pivot (rotation center) of the seatback part 12 are close to each other, when the rearward inclination angle of the seatback part 12 of the seating part 10 is adjusted, a relative displacement is small between the changed position of the back of the occupant P and the changed position of the seating surface of the seatback part 12. Therefore, when the rearward inclination angle of the seatback part 12 becomes large, it is possible to prevent discomfort caused by the occupant P's clothing sliding up due to the above-mentioned relative displacement.

Meanwhile, because the hip point HP, which is the center of pivot of the upper part of the occupant P's body, and the center of pivot of the upper shell 21 are separated from each other, when the rearward inclination angle of the upper shell 21 is adjusted simultaneously with the rearward inclination angle of the seatback part 12, a relative displacement becomes large between the changed position of the upper part of the occupant P's body and the changed position of the upper shell 21. That is, the height of the upper shell 21 becomes large in the direction of the seated height of the occupant P with respect to the seat cushion part 11. Therefore, when the rearward inclination angle of the upper shell 21 is increased, the upper shell 21, which is lower than the seated height of the occupant P in a normal mode shown by the solid line in FIG. 9, relatively moves up to the same position as the seated height of the occupant P in a relaxed mode shown by an imaginary line in FIG. 9 because of the above-mentioned relative displacement. Hence, in the relaxed mode, the occupant P is given a sense of personal space, and, in the normal mode, a given distance 1 is ensured between the upper end of the upper shell 21 and a ceiling L of the vehicle as shown in FIG. 5.

The position of the seatback part 12 with respect to the occupant P is kept constant regardless of changes of the rearward inclination angle of the seatback part 12 because the rotation centers of the seatback part 12 and the occupant P are close to each other. As a result, in the normal mode shown by the solid line in FIG. 9, the upper end position of the upper shell 21 and the upper end position of the seatback part 12 are substantially the same in the direction of the seated height of the occupant P. On the other hand, in the relaxed mode shown by the imaginary line in FIG. 9, the upper end position of the upper shell 21 is higher than the upper end position of the seatback part 12 in the direction of the seated height of the occupant P.

Figure 4:
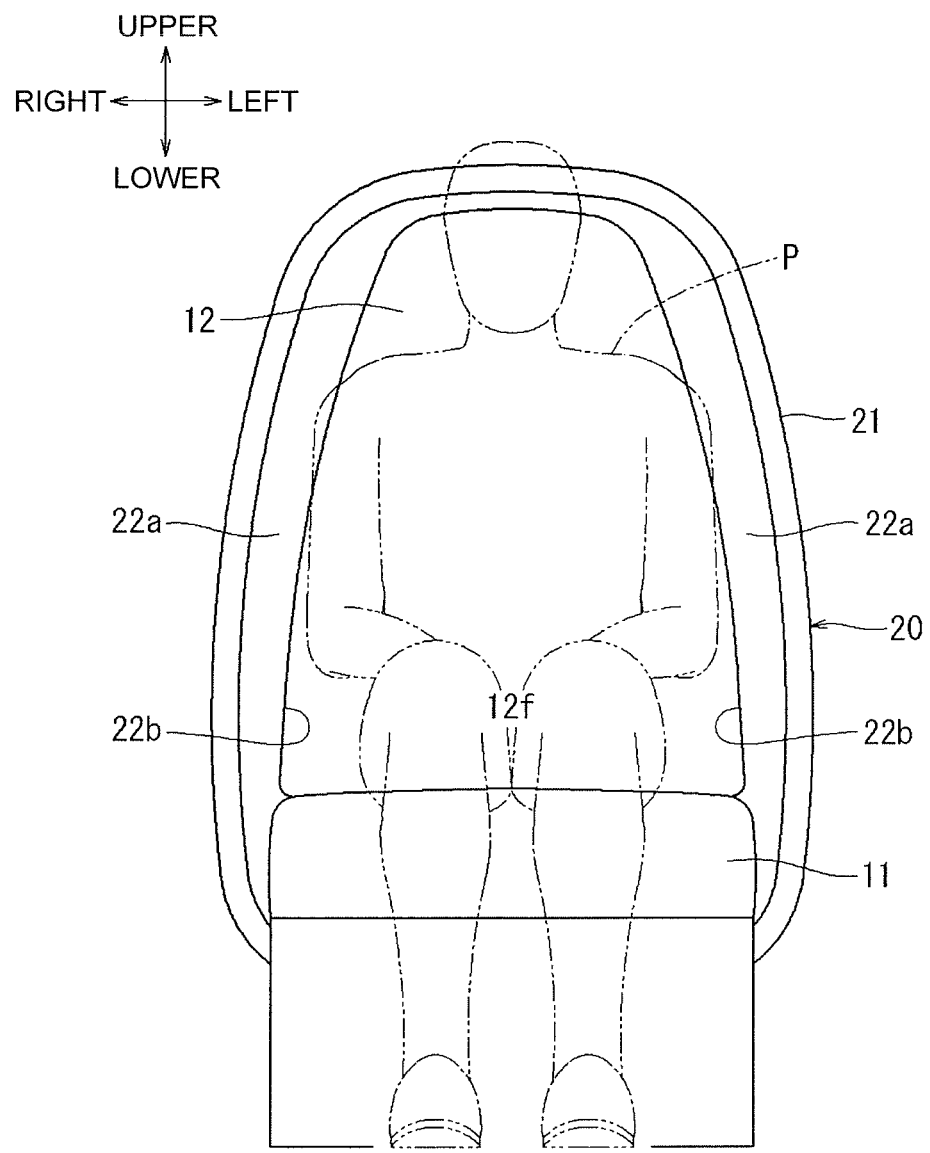
FIG. 4 is a front view of the embodiment.

As shown in FIG. 4 and FIG. 5, when the seatback part 12 and the upper shell 21 are at the normal mode positions, the seatback part 12 is fitted into a cut out part 22*b* formed in the elastic body 22 of the upper shell 21 (see FIG. 7). That is, the cut out part 22*b* is formed in the elastic body 22 of the upper shell 21 so as to correspond to an outer shape of the seatback part 12.

As shown in FIG. 6, when the seatback part 12 and the upper shell 21 are in the relaxed mode, the upper shell 21 moves up relatively to the seatback part 12. Therefore, as shown in FIG. 4, the boundary between the seatback part 12 and the upper shell 21 is formed so as to become wider gradually towards the bottom. Then, in the relaxed mode, due to the relative movements between the seatback part 12 and the upper shell 21, a gap is formed in the boundary (see FIG. 8).

As shown in FIG. 4, the width of the upper shell 21 in the right and left direction becomes larger towards the bottom. Therefore, in the relaxed mode, when the upper shell 21 is moved up relative to the seatback part 12, the occupant P is positioned in a wide area of the upper shell 21. Therefore, the occupant P is able to take a relaxed posture comfortably.

Figure 10:
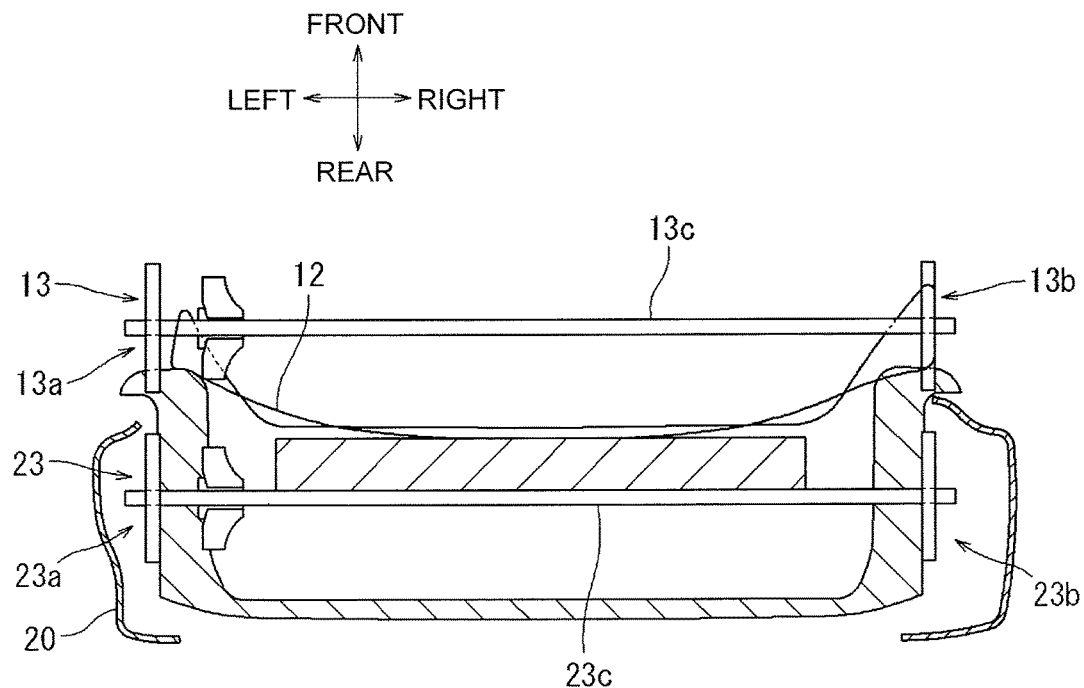
FIG. 10 is a sectional view taken along the arrows X-X in FIG. 9.

As shown in FIG. 10, the first reclining mechanism 13 includes a driving-side recliner 13*a* and a driven-side recliner 13*b*, which are connected with each other by a connection rod 13*c*. Therefore, as a first motor drives the driving-side recliner 13*a*, the driven-side recliner 13*b* is also driven in conjunction through the connection rod 13*c*. The driving-side recliner 13*a* and the driven-side recliner 13*b* are rotatable and connect both sides of a rear part of the seat cushion part 11 and both sides of a lower part of the seatback part 12.

The second reclining mechanism 23 has the same structure as that of the first reclining mechanism 13. That is, the second reclining mechanism 23 includes a driving-side recliner 23*a* and a driven-side recliner 23*b*, which are connected with each other by a connection rod 23*c*. The driving-side recliner 23*a* and the driven-side recliner 23*b* are rotatable and connect both sides of a rear part of the seat cushion part 11 and both sides of a lower part of the upper shell 21.

Figure 12:
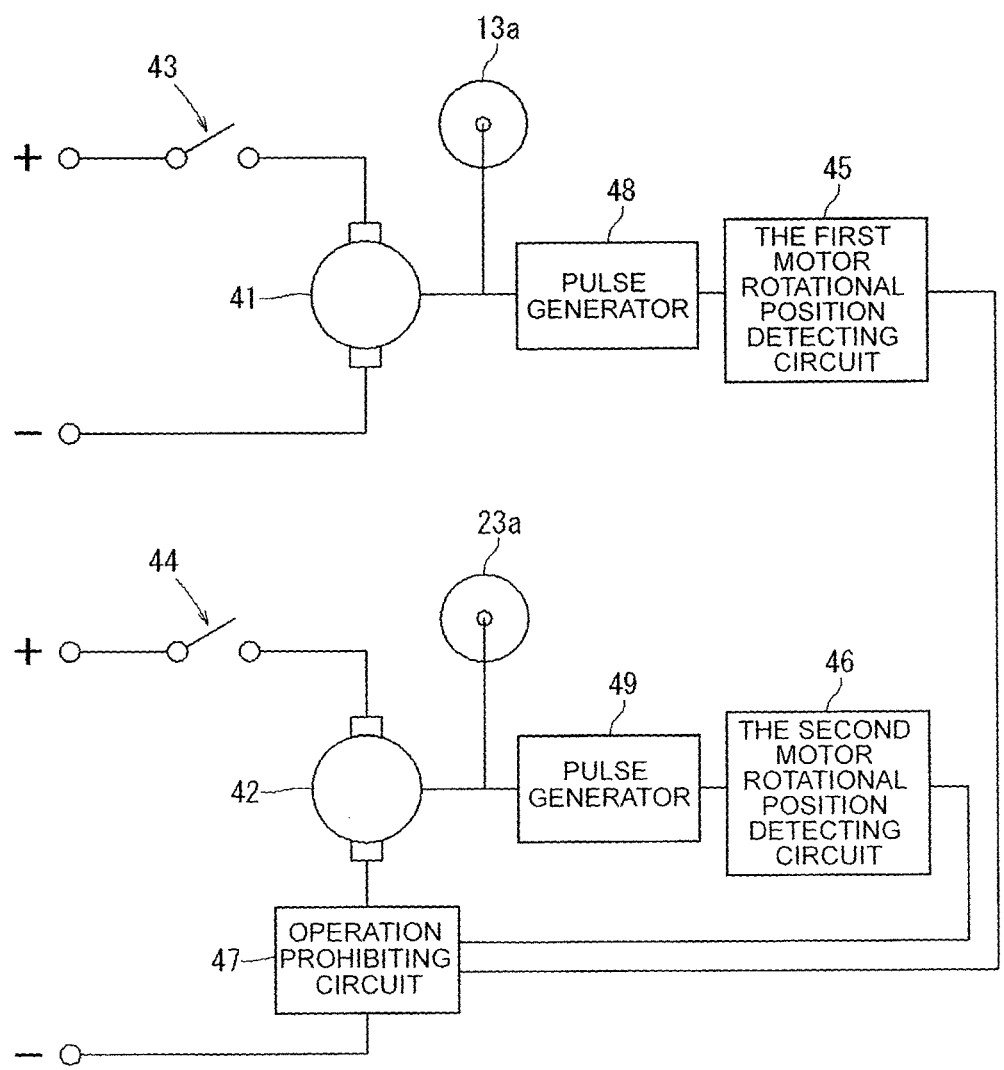
FIG. 12 is an electrical diagram of the embodiment.

As shown in FIG. 12, the first motor 41 is configured to drive and rotate the driving-side recliner 13*a* of the first reclining mechanism 13, and is connected with a power source through a switch 43 that is turned on and off in a given manner. The first motor 41 is configured so as to cause a pulse generator 48 to generate a pulse signal at every given angle of rotation, and, upon receipt of the pulse signals, a first motor rotational position detecting circuit 45 detects a rotational position of the first motor 41 based on the number of pulse signals.

Meanwhile, a second motor 42 is configured so as to drive and rotate the driving-side recliner 23*a* of the second reclining mechanism 23, and is connected with a power source through a switch 44 that is turned on and off in a given manner. The second motor 42 is configured similarly to the first motor 41. Also a second motor rotational position detecting circuit 46 is configured similarly to the first motor rotational position detecting circuit 45, and detects a rotational position of the second motor 42 based on the number of pulse signals from a pulse generator 49.

Detection outputs from the first motor rotational position detecting circuit 45 and the second motor rotational position detecting circuit 46 are supplied to an operation prohibiting circuit 47. The operation prohibiting circuit 47 stops an operation of the second motor 42 by interrupting an energizing circuit of the second motor 42 when the rotational position of the second motor 42 detected by the second motor rotational position detecting circuit 46 is separated at a given amount or more from the rotational position of the first motor 41 detected by the first motor rotational position detecting circuit 45. The rotational position of the first motor 41 corresponds to the rearward inclination angle of the seatback part 12, and the rotational position of the second motor 42 corresponds to the rearward inclination angle on the upper shell 21. Therefore, the operation prohibiting circuit 47 restricts a relative distance of the upper shell 21 from the seatback part 12 within a given amount, thus preventing the upper shell 21 from being separated from the seatback part 12 by a given amount or more.

As stated above, since the upper shell 21 is configured not to be separated from the seatback part 12 by an given amount or more, total strength of the seatback part 12 and the upper shell 21 ensures strength of a seat required for collision safety and so on.

Figure 13:
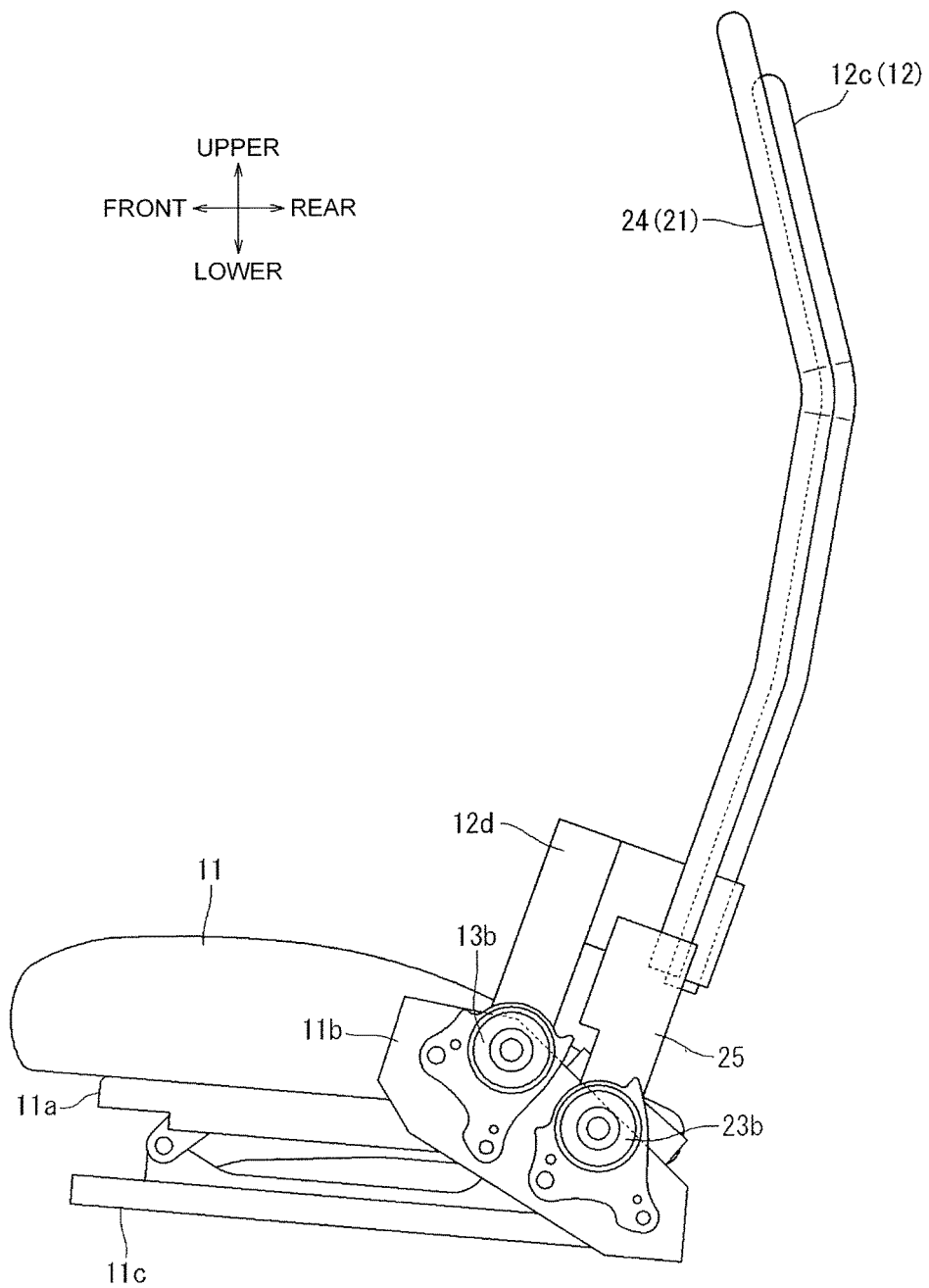
FIG. 13 is a side view of framework structures of the seating part and the shell part according to the embodiment.
Figure 14:
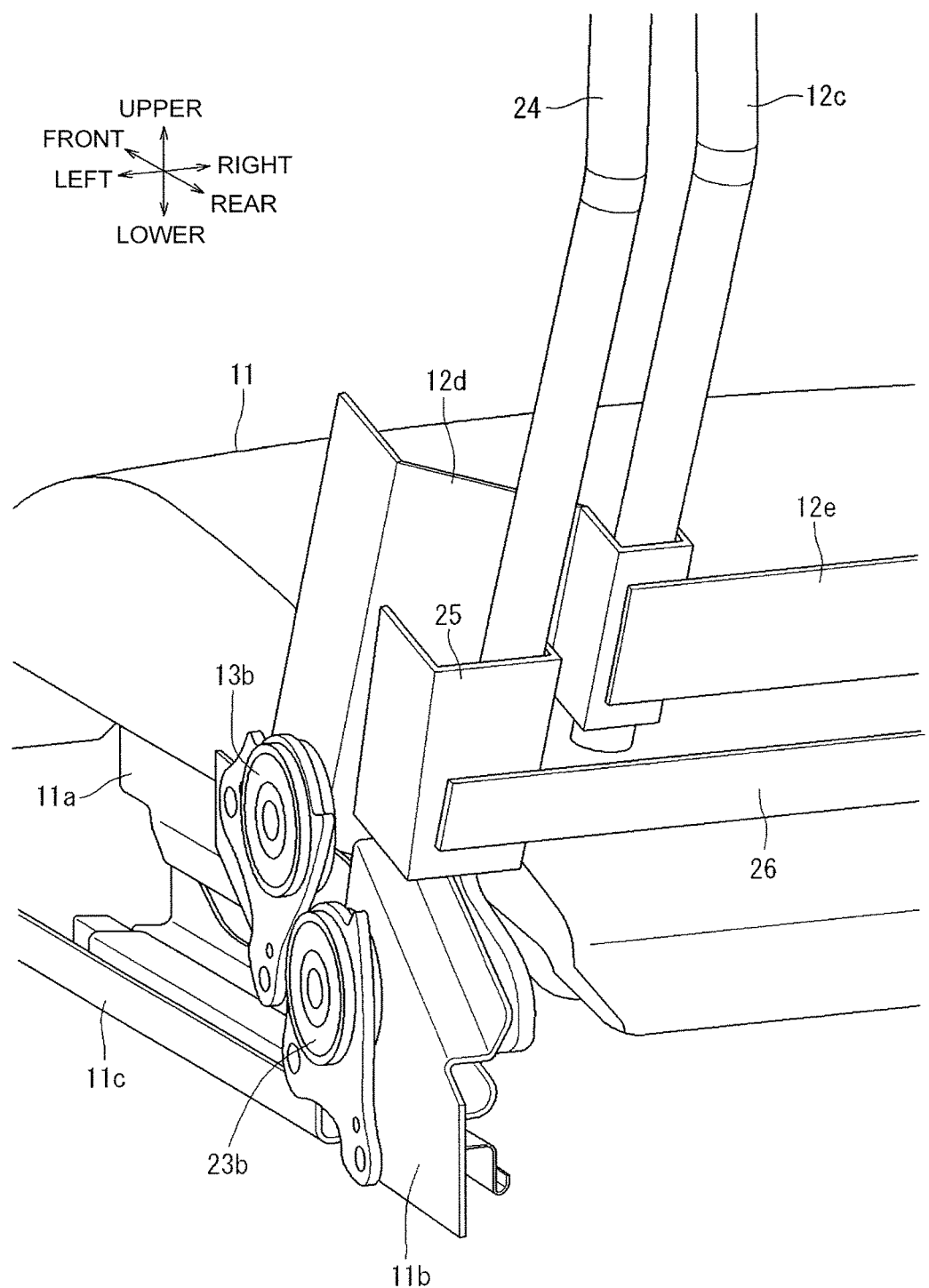
FIG. 14 is a perspective view of the framework structures similar to FIG. 13.

FIG. 13 and FIG. 14 show framework structures of the seating part 10 and the upper shell 21. As in a general vehicle seat, a cushion frame 11a of the seat cushion part 11 is supported on a slide rail 11c. On outer sides of the cushion frame 11a on both right and left sides, brackets 11b are fixed, and the brackets 11b are inclined upwardly towards the front side (only the left side is shown in FIG. 13 and FIG. 14). Along the inclination of the brackets 11b, the recliners of the first reclining mechanism 13 (the driven-side recliner 13b is shown in FIG. 13 and FIG. 14) are fixed to upper front sides of the brackets 11b, and the recliners of the second reclining mechanism 23 (the driven-side recliner 23b is shown in FIG. 13 and FIG. 14) are fixed to lower bottom sides of the brackets 11b.

Back frames 12c, 24, which are framework members of the seatback part 12 and the upper shell 21 of the seating part 10, have shapes similar to each other and are configured using substantially inverted U-shaped pipes, respectively. The back frames 12c, 24 are arranged so as to be fitted to each other in a positional relation in which the back frame 12c is positioned at an inner side and also at a slightly rear side with respect to the back frame 24 (in other words, the back frame 12c is positioned inside the back frame 24, and slightly behind the back frame 24). The back frames 12c, 24 are fixed to the brackets 11b through the recliners (the driving-side recliners 13a, 23a and the driven-side recliners 13b, 23b) and brackets 12d, 25, respectively, so that their rearward inclination angles are adjustable. Further, lower panels 12e, 26 are fixed to rear parts of the brackets 12d, 25, respectively, thus connecting the brackets 12d arranged on both right and left sides, and connecting the brackets 25 arranged on both right and left sides.

The state shown in FIG. 13 and FIG. 14 is a state where the seating part 10 and the upper shell 21 are overlapped with each other in the front-rear direction and are integrated with each other, that is, a state in the normal mode. In this state, the back frame 12c and the brackets 12d, which are the framework members of the seatback part 12, and the back frame 24 and the brackets 25, which are the framework members of the upper shell 21, are arranged so as not to interfere with each other. Then, from this state, it is possible to incline the back frame 12c and the back frame 24 together toward the rear side by operating the recliners (the driving-side recliners 13a, 23a and the driven-side recliners 13b, 23b). Further, it is possible to operate the recliners so that the rearward inclination angle of the back frame 24 becomes larger than that of the back frame 12c.

Figure 11:
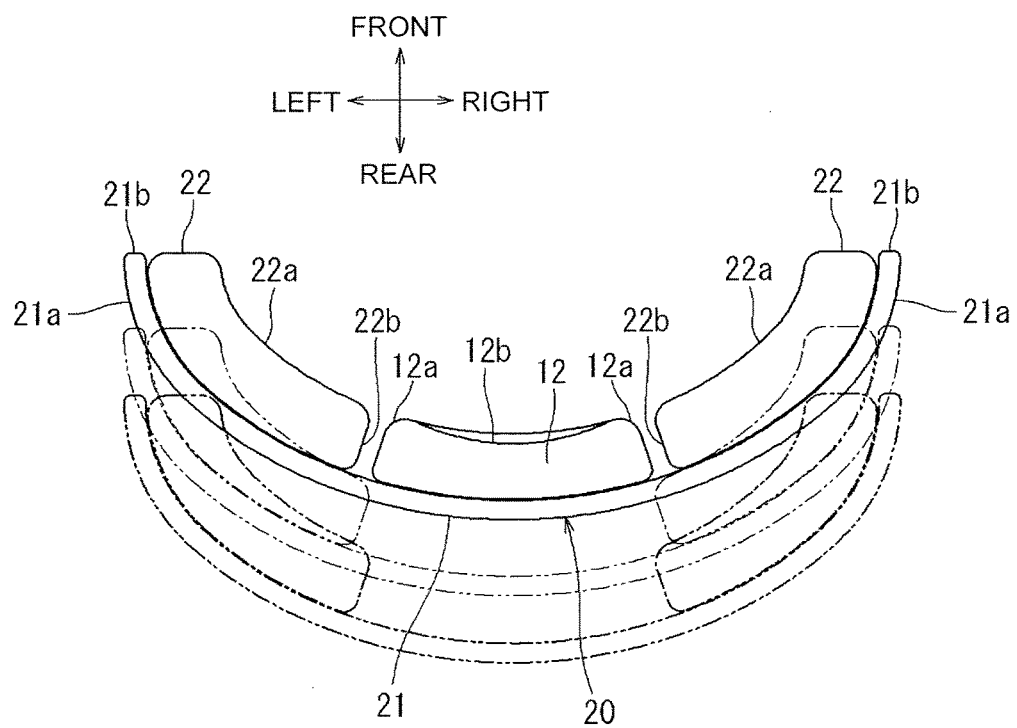
FIG. 11 is a view illustrating an operation in the embodiment and shows in a plan view how the position of the shell part changes between the state where the shell part is separated from the seating part and the state where the shell part is not separated from and integrated with the seating part.

FIG. 11 shows changes of the positions of the seatback part 12 and the upper shell 21 between the state where the upper shell 21 is separated from the seatback part 12 and the state where the upper shell 21 is not separated from and integrated with the seatback part 12. The solid line in FIG. 11 shows a state where the upper shell 21 is not separated from and integrated with the seatback part 12, and the seating surface of the seatback part 12 is formed along a single curved surface together with the front-side surface of the elastic body 22 of the upper shell 21, so the occupant P is supported with sufficient room on the seating surface extending along the single curved surface. Moreover, both sides of the occupant P are covered by both side parts 21a of the upper shell 21, thereby giving the occupant P a sense of personal space.

Meanwhile, in FIG. 11, the imaginary lines show states where the upper shell 21 is separated from the seatback part 12. At the position shown by the thicker imaginary line, the both side end portions 21b of the both side parts 21a of the upper shell 21 are at the same positions as or behind both side end portions 12a of the seatback part 12. This is the position where an operation of the second motor 42 is stopped by the operation prohibiting circuit 47, and the upper shell 21 is not separated from the seatback part 12 any farther. In this state, both sides of the upper part of the seated occupant P's body are not covered by the both side parts 21a of the upper shell 21. Therefore, the occupant P is able to have a sense of openness without having a feeling of being closed or pressed. Also, it is possible to ensure seat strength by maintaining the linked relation between the seatback part 12 and the upper shell 21.

The position shown by the thinner imaginary line represents a case where clearance from the upper shell 21 to the seatback part 12 is at an intermediate level. Unlike the case shown by the solid line, at this position, the occupant P is not supported on the seating surface that extends along the single curved surface. However, although the curved surface 22a of the elastic body 22 of the upper shell 21 and the curved surface 12b of the seatback part 12 are separated from each other in the front-rear direction, the occupant P's body is supported across the seatback part 12 and the curved surface 22a of the elastic body 22 of the upper shell 21. As a result, the occupant P is able to have a sense of openness to some extent while an appropriate area that supports the occupant P's body is ensured by adjusting the above-mentioned clearance. Thus, the occupant P is able to make adjustments according to his/her preference.

As described earlier with reference to FIG. 9, the rotation center of the first reclining mechanism 13, which is the center of rotation of the seatback part 12, is set at a position that is lower than and behind the hip point HP that is the center of pivot of the upper part of the occupant P's body. Further, the rotation center of the second reclining mechanism 23, which is the center of rotation of the upper shell 21, is set at a position that is lower than and behind the rotation center of the first reclining mechanism 13. The hip point HP, the rotation center of the first reclining mechanism 13, and the rotation center of the second reclining mechanism 23 are arranged so that they are aligned on substantially the same straight line.

Figure 15:
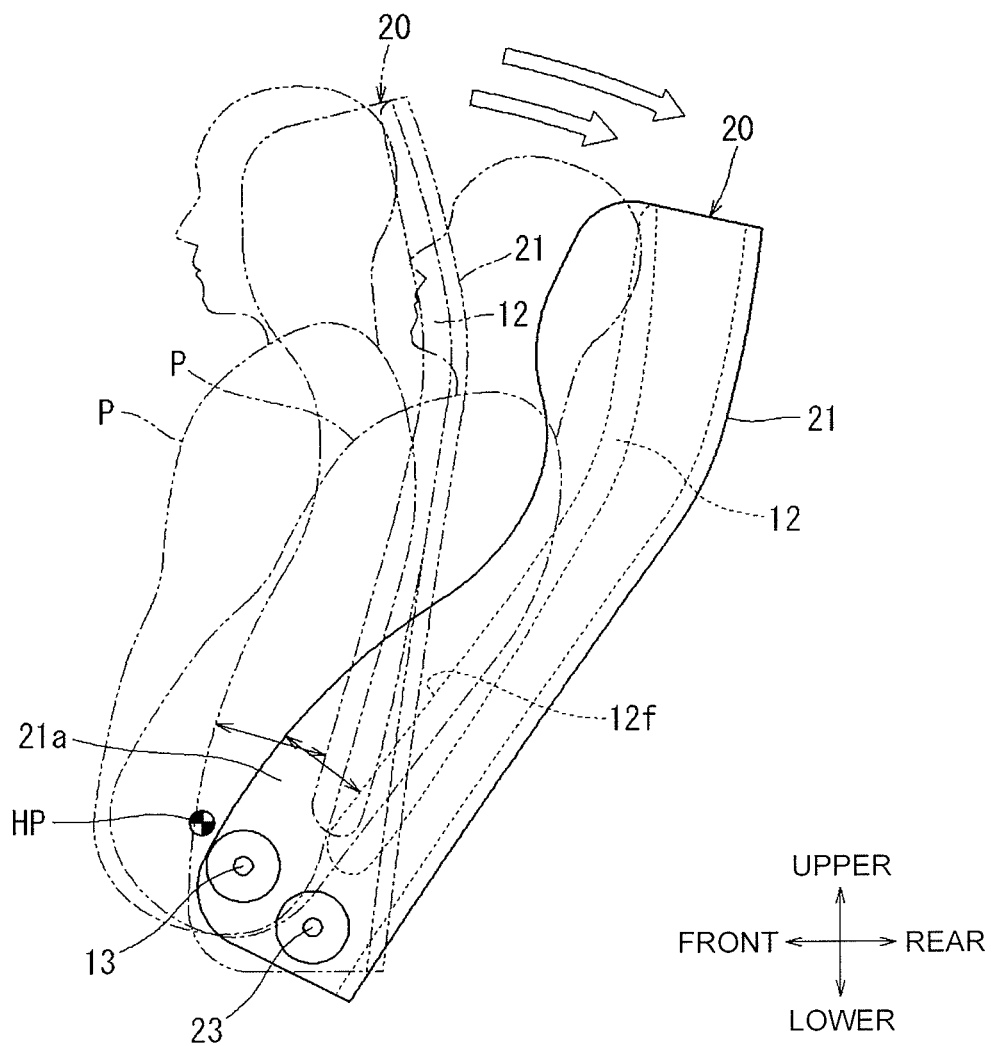
FIG. 15 is a side view showing a state where an upper shell is inclined rearward more than the seatback part according to the embodiment.
Figure 16:
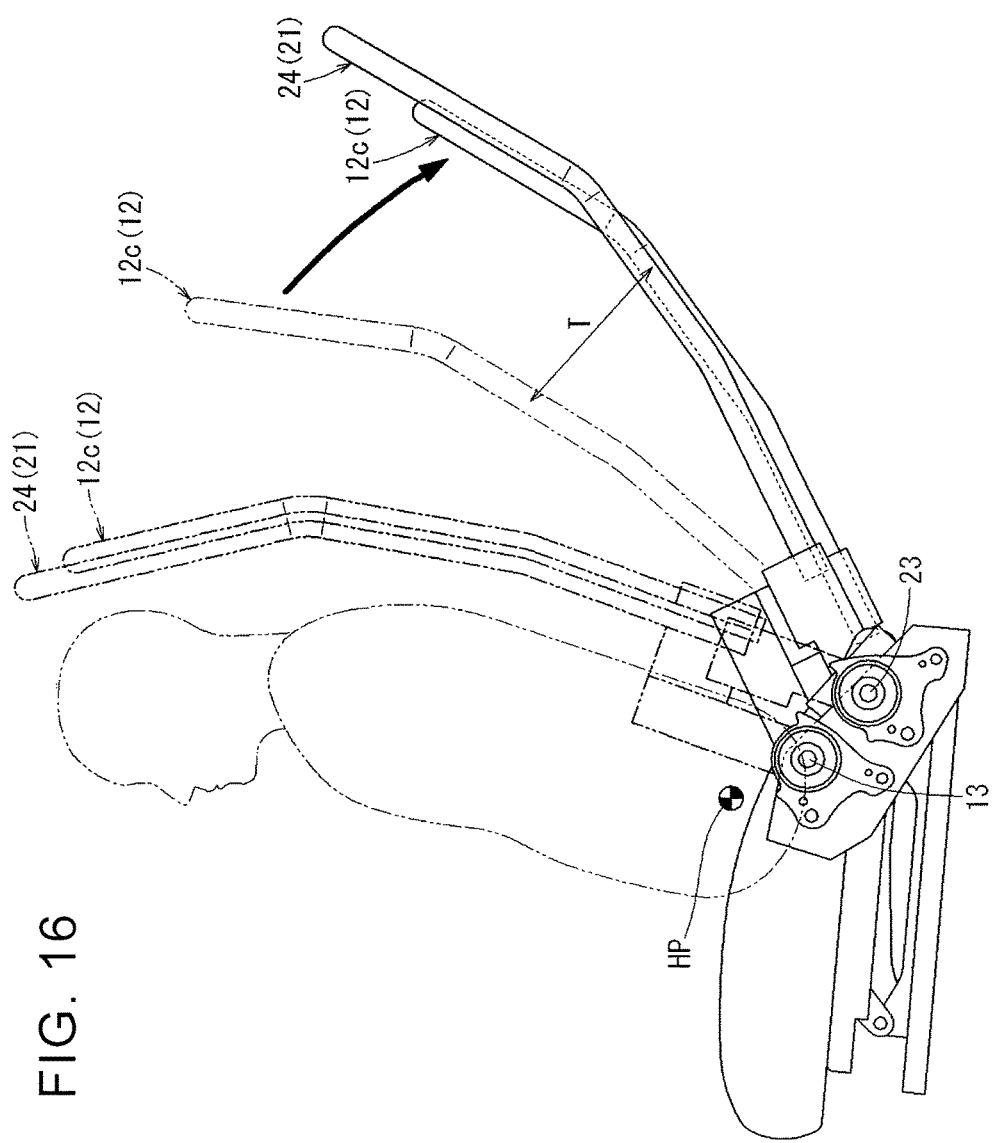
FIG. 16 is a side view of a positional relation when the seatback part and the upper shell are inclined rearward.
Figure 17:
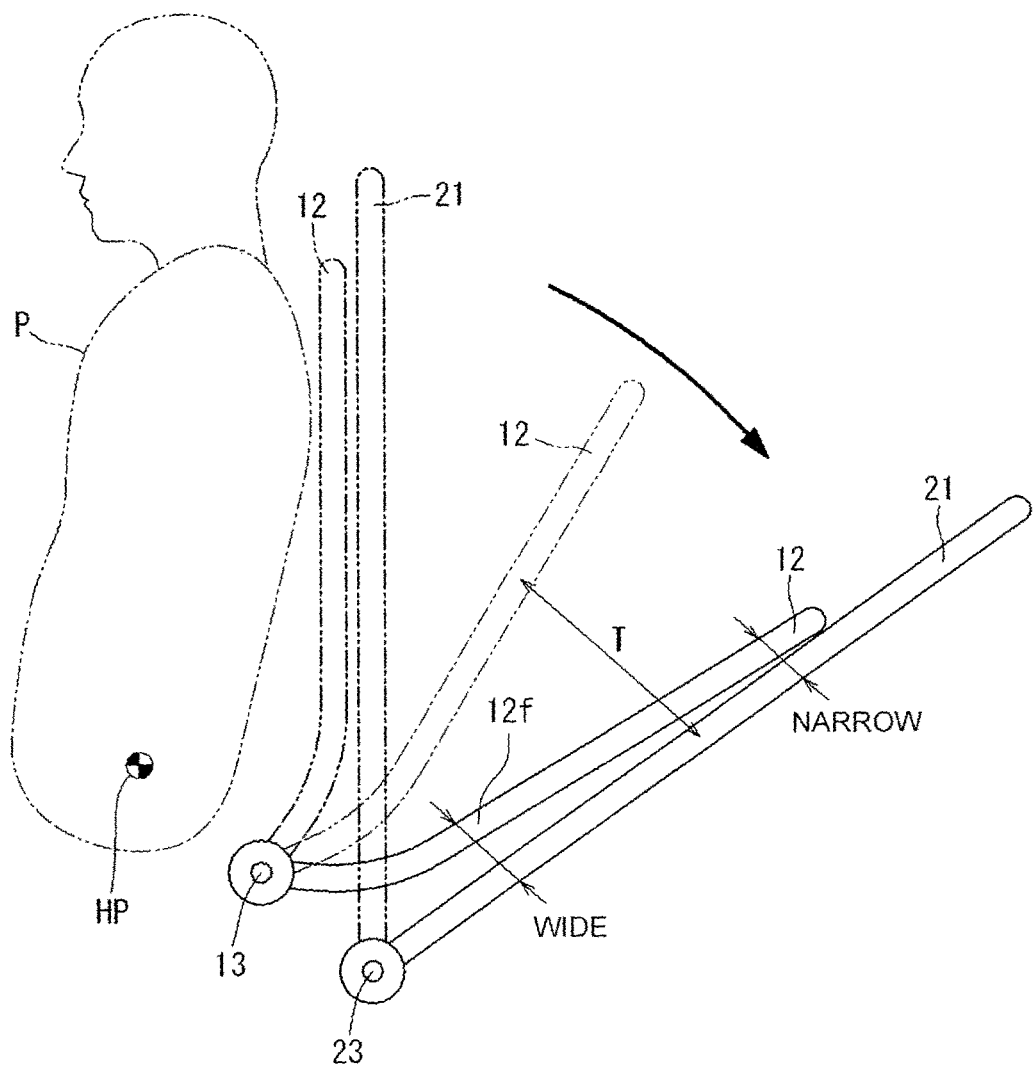
FIG. 17 is a schematic view of a simplified model of FIG. 16.

As a result, as shown in FIG. 15, regardless of whether the seatback part 12 and the upper shell 21 are inclined rearward in a state where they are integrally overlapped with each other or separated from each other, the seatback part 12 and the upper shell 21 move so that a distance between their root-side areas close to their rotation centers becomes gradually larger as they are inclined rearward. To be specific, as shown in FIG. 16 and FIG. 17, as the seatback part 12 and the upper shell 21 are inclined rearward by the same angle each time from the position where the seatback part 12 and the upper shell 21 are overlapped with each other at the normal mode position shown by the thick imaginary line, the seatback part 12 and the upper shell 21 are moved so that a distance T between the seatback part 12 and the upper shell 21 increases gradually with an increase in rearward inclination angles.

Hence, as stated above, by inclining the seatback part 12 and the upper shell 21 by the same angle each time, the seatback part 12 moves frontward relatively to the upper shell 21 while being inclined rearward. As shown by the solid lines in FIG. 16 and FIG. 17, this relative movement occurs in a lower area 12f of the seatback part 12 close to its rotation center even when the seatback part 12 is inclined rearward to a position where the seatback part 12 is overlapped with the upper shell 21, in other words, even when the seatback part 12 and the upper shell 21 are inclined in a state of being overlapped with each other integrally.

Thus, in the lower area 12f of the seatback part 12 close to its rotation center, a distance between the seatback part 12 and the upper shell 21 is maintained to be larger than a distance between areas of the seatback part 12 and the upper shell 21 on their distal end sides, even when the seatback part 12 is inclined rearward to a position where the seatback part 12 is integrally overlapped with the upper shell 21 at the relaxed mode position, and the areas of the seatback part 12 and the upper shell 21 on their distal end sides away from their rotation centers make contact with each other. As a result, the lower area 12f of the seatback part 12 supports the occupant P's hip area at a position ahead of the upper shell 21. As a result, as shown by the solid line in FIG. 2, the both side parts 21a of the upper shell 21, which support both side portions of the seated occupant P, are less protruded toward the front side with respect to the lower area 12f of the seatback part 12 (i.e., the degree of protrusion of the both side parts 21a of the upper shell 21 toward the front side with respect to the lower area 12f of the seatback part 12 is reduced) such that the both side parts 21a recede to the lower rear side. Hence, since the both side parts 21a of the upper shell 21 are less protruded, when the seated occupant P's arms lean against the both side parts 21a of the upper shell 21 due to gravity, it is unlikely that the occupant P feels cramped as if his/her arms are squeezed in the width direction.

To summarize the above, the seat has the following structure. The seat includes the main part (the seatback part 12) forming the center portion of the front surface of the seatback, and the bolster parts (the both side parts 21a of the upper shell 21) forming the side parts of the front surface of the seatback. This seat includes the reclining adjuster (the first reclining mechanism 13 and the second reclining mechanism 23) configured to adjust a backrest angle of the seatback. The reclining adjuster (the first reclining mechanism 13 and the second reclining mechanism 23) is configured to move the lower area (the lower area 12f) of the main part (the seatback part 12) toward the front side with respect to the bolster parts (the both side parts 21a of the upper shell 21) along with a reclining movement of the main part (the seatback part 12).

Due to this structure, when the seatback is reclined, the lower area (the lower area 12f) of the main part (the seatback part 12) moves toward the front side with respect to the bolster parts (the both side parts 21a of the upper shell 21) as the main part (the seatback part 12) is reclined. Therefore, even when the bolster parts (the both side parts 21a of the upper shell 21) protrude and bulge toward the front side in order to support both side portions of a seated occupant P, the bolster parts (the both side parts 21a of the upper shell 21) become less protruded when the seatback is reclined, thereby alleviating a feeling of being cramped (confined) due to the protrusion of the bolster parts.

The reclining adjuster (the first reclining mechanism 13 and the second reclining mechanism 23) is configured so as to allow the main part (the seatback part 12) and the bolster parts (the both side parts 21a of the upper shell 21) to operate independently of each other. With this structure, the relative movements of the main part (the seatback part 12) and the bolster parts (the both side parts 21a of the upper shell 21) are realized by a combination of individual small movements or individual simple movements.

More specifically, the reclining adjuster (the first reclining mechanism 13 and the second reclining mechanism 23) is configured such that the main part (the seatback part 12) and the bolster parts (the both side parts 21a of the upper shell 21) are operated independently of each other by the main reclining mechanism (the first reclining mechanism 13) and the side reclining mechanism (the second reclining mechanism 23), respectively. The main reclining mechanism (the first reclining mechanism 13) is configured to adjust a backrest angle of the main part (the seatback part 12), and the side reclining mechanism (the second reclining mechanism 23) is configured to adjust a backrest angle of the bolster parts (both side parts 21a of the upper shell 21). In other words, the reclining adjuster includes the main reclining mechanism and the side reclining mechanism.

The main reclining mechanism (the first reclining mechanism 13) and the side reclining mechanism (the second reclining mechanism 23) are configured so as to change the backrest angles by rotating about the rotation centers that are set independently of each other. The rotation center of the main reclining mechanism (the first reclining mechanism 13) is set at a position that is closer to the hip point HP of the seated occupant P than the rotation center of the side reclining mechanism (the second reclining mechanism 23) is. With the structure, the bolster parts (the both side parts 21a of the upper shell 21) are reclined about the rotation center that is farther from the hip point HP than the rotation center of the main part (seatback part 12) is. Therefore, the bolster parts (the both side parts 21a of the upper shell 21) are moved in the reclining direction more efficiently than the main part (the seatback part 12), and the lower area (the lower area 12f) of the main part (the seatback part 12) is easily moved toward the front side relative to the bolster parts (the both side parts 21a of the upper shell 21).

Further, the rotation center of the main reclining mechanism (the first reclining mechanism 13) and the rotation center of the side reclining mechanism (the second reclining mechanism 23) are set at positions such that the distance T between the main part (the seatback part 12) and the bolster parts (the both side parts 21a of the upper shell 21) increases as the reclining angle of each of the main part and the bolster parts increases. With the structure, the bolster parts (the both side parts 21a of the upper shell 21) are moved in the reclining direction more efficiently than the main part (the seatback part 12), and the lower area (the lower area 12f) of the main part (the seatback part 12) is easily moved toward the front side relative to the bolster parts (the both side parts 21a of the upper shell 21).

Further, the rotation center of the main reclining mechanism (the first reclining mechanism 13) and the rotation center of the side reclining mechanism (the second reclining mechanism 23) are set at positions such that positions of the bolster parts (the both side parts 21a of the upper shell 21) relative to the main part (the seatback part 12) in the rotation radius direction (heights of the bolster parts in the direction of the seated height) are moved up as the reclining angle of each of the bolster parts (the both side parts 21a of the upper shell 21) and the main part (the seatback part 12) increases. With the structure, as the main part (the seatback part 12) and the bolster parts (the both side parts 21a of the upper shell 21) are reclined, the bolster parts (the both side parts 21a of the upper shell 21) move relative to the main part (the seatback part 12) toward the side of the head part of the seatback, which is the outer side of the rotation radius. Hence, this structure can be applied in order to improve comfort at the time of reclining. That is, for example, side support-shaped portions provided in the bolster parts (the both side parts 21a of the upper shell 21) may be brought to both sides of the seated occupant P's head as the seatback is reclined, as described above.

Further, the rotation center of the main reclining mechanism (the first reclining mechanism 13) is set at a position that is lower than and behind the hip point HP of the seated occupant P, and the rotation center of the side reclining mechanism (the second reclining mechanism 23) is set at the position that is lower than and behind the rotation center of the main reclining mechanism (the first reclining mechanism 13). With the structure, the main reclining mechanism (the first reclining mechanism 13) and the side reclining mechanism (the second reclining mechanism 23) are operated optimally in accordance with their reclining operations, respectively, so that the bolster parts (the both side parts 21a of the upper shell 21) become less protruded.

Figure 18:
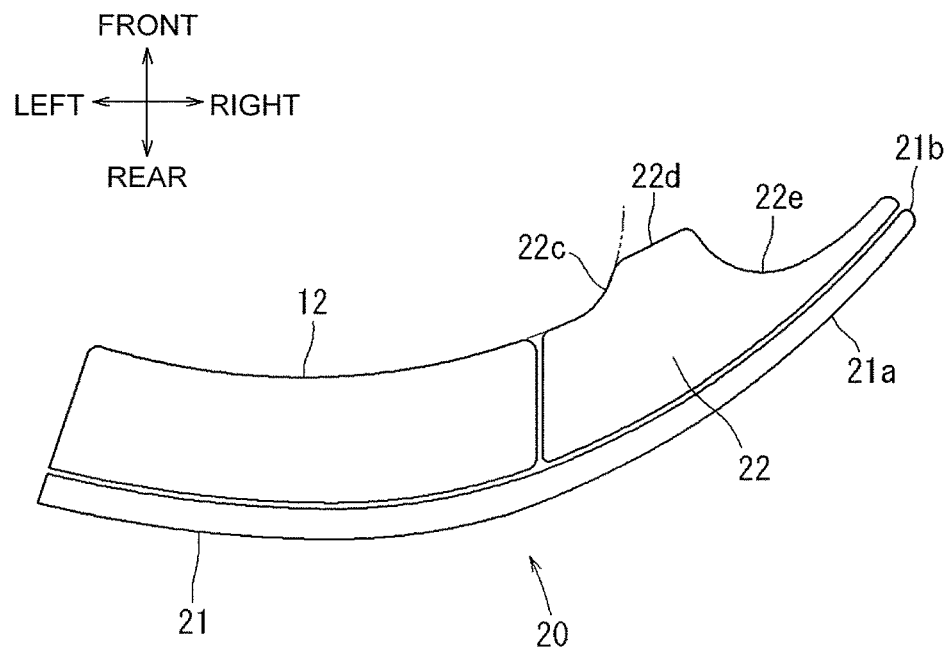
FIG. 18 is a view corresponding to FIG. 7 and shows a modification of an elastic body in the upper shell.
Figure 19:
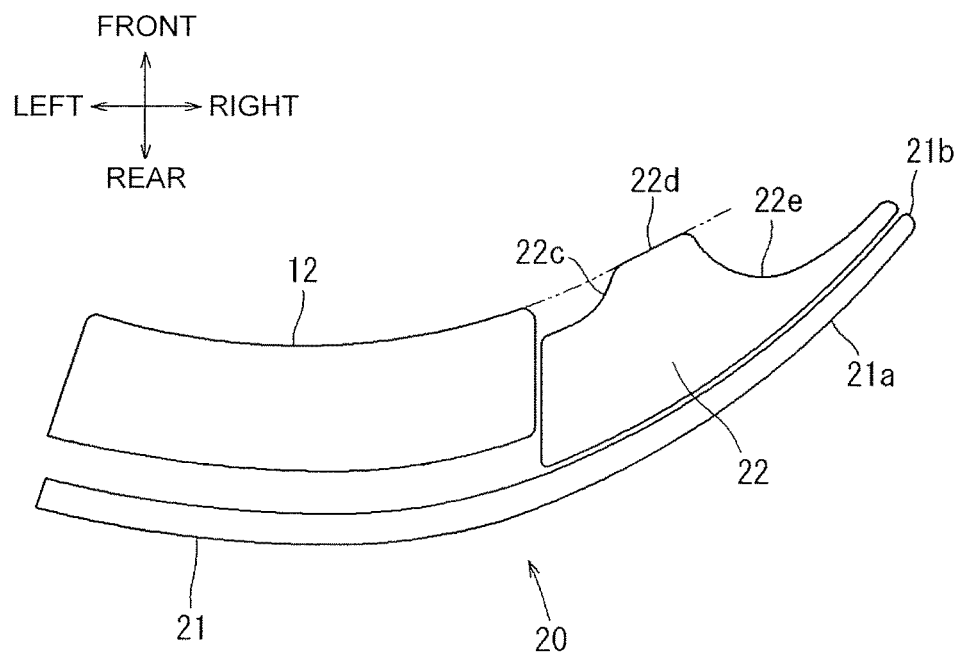
FIG. 19 is a view similar to FIG. 18 and shows a state where the shell part is separated from the seating part.

FIG. 18 and FIG. 19 show a modification of the elastic body 22 of the upper shell 21. In this modification, the shape of the seating surface side of the elastic body 22 is modified from that in the above embodiment. Specifically, a projecting portion 22d, which projects on the seating surface side, is formed in a center part of the elastic body 22 in the right-left direction, and a recess is formed on the outer side (the right side in FIG. 18) of the projecting portion 22d in the right-left direction. Due to this recess, an outer-side curved part 22e, which is recessed, is formed on the seating surface side. Further, on the inner side of the projecting portion 22d in the right-left direction, an inner-side curved part 22c, which is recessed, is formed on the seating surface side.

According to this modification, as shown in FIG. 18, in the state where the upper shell 21 is not separated from and integrated with seatback part 12, the seating surface of the seatback part 12 is formed along a single curved surface together with the inner-side curved part 22c of the elastic body 22 of the upper shell 21 as shown by the imaginary line. An occupant P is thus supported with sufficient room on the seating surface that expands along the single curved surface.

Meanwhile, as shown in FIG. 19, in the state where the upper shell 21 is separated slightly from the seatback part 12, and the seating surface side of the projecting portion 22d is aligned with the seating surface of the seatback part 12 along the single curved surface (shown by the imaginary line), the occupant P's body is supported by the seating surface side of the projecting portion 22d and the seating surface of the seatback part 12, which are aligned with each other along the single curved surface. Thus, the seating surface, which is wider than that in FIG. 18, is able to support a larger occupant P with sufficient room.

The specific embodiment has been explained so far. However, the disclosure is not limited to the appearance and structure of the embodiment, and various changes, additions, and deletions can be made without departing from the scope of the disclosure. For example, various modifications can be made as long as the main part is moved by the reclining adjuster so that the lower area of the main part is moved toward the front side with respect to the bolster parts as the main part is reclined. That is, in a vehicle seat in which the main part and the bolster parts are configured integrally with each other, the reclining adjuster may move the lower area of the main part toward the front side with respect to the bolster parts along with the reclining of the main part and the bolster parts so that an effect of a lumbar support that supports a seated occupant's lumbar area is enhanced.

Also, the reclining adjuster may be configured to move the lower area of the main part frontward with respect to the bolster parts as the main part is inclined rearward, while filling the gap that is formed between the main part and the seat cushion as the main part is inclined rearward. By employing the structure, even if the rotation center of the reclining of the main part is set at a position at the same height as or lower than the seat cushion to allow the main part to be inclined rearward to be on the same plane as or lower than the seat cushion, it is possible to fill the gap that is formed between the main part and the seat cushion due to the rearward inclining, thereby connecting the main part and the seat cushion with each other smoothly. Further, the reclining adjuster may function to fill a gap or a step that is formed between the main part and the seat cushion due to the reclining of the seatback so that the main part and the seat cushion are connected with each other smoothly, regardless of the position of the rotation center of the seatback.

The reclining adjuster may allow the main part and the bolster parts to operate independently of each other, and may also allow only the main part to operate. Even when only the main part is operated, it is still possible to move the lower area of the main part toward the front side relative to the bolster parts along with the reclining movement of the main part. With the reclining of the main part, the lower area of the main part is moved toward the front side relative to the bolster parts. This movement of the lower area of the main part may be carried out by relative operations, in other words, may be carried out based on different movement trajectories of the main part and the bolster parts when they are relined. However, the movement may also be carried out by an absolute operation of moving the lower part of the main part toward the front part. By moving the lower part of the main part toward the front side along with reclining, it is possible to increase an actual inclination angle of the main part due to the projection of the lower area even when the reclining angle of the main part is small. Further, the main part and the bolster parts may be reclined by the reclining adjuster through uniaxial rotations, and may also be reclined by sliding or linkage.

Further, the bolster parts do not necessarily need to have the side support-shaped portions that bulge toward the front side relative to the main part, and may instead have front surfaces that are in flush with the main part.

The term vehicle may refer to any machine or conveyance that carries people or things from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:

1. A vehicle seat comprising:
   a main part that forms a center portion of a front surface of a seatback;
   bolster parts that form side parts of the front surface of the seatback; and
   a reclining adjuster rotatably connected to the main part and the bolster parts, and configured to adjust a backrest angle of the seatback, and to move a lower area of the main part toward a front side of the vehicle seat relative to the bolster parts as the main part is reclined.
2. The vehicle seat according to claim 1, wherein
   the reclining adjuster includes a main reclining mechanism and a side reclining mechanism that are configured to respectively operate the main part and the bolster parts independently of each other.
3. The vehicle seat according to claim 2, wherein
   the main reclining mechanism is rotatably connected to the main part and configured to adjust a backrest angle of the main part, and the side reclining mechanism is rotatably connected to the bolster parts and configured to adjust a backrest angle of the bolster parts.
4. The vehicle seat according to claim 3, wherein
   the main reclining mechanism and the side reclining mechanism each include a rotation center about which the main part and the bolster parts rotate, respectively, so as to change the backrest angles of the main part and the bolster parts, and
   the rotation center of the main reclining mechanism is set at a position closer to a hip point of a seated occupant to be seated on the vehicle seat than a position of the rotation center of the side reclining mechanism.
5. The vehicle seat according to claim 4, wherein
   the rotation center of the main reclining mechanism and the rotation center of the side reclining mechanism are set at positions such that a distance between the main part and the bolster parts increases as a reclining angle of each of the main part and the bolster parts increases.
6. The vehicle seat according to claim 4, wherein
   the positions of the rotation center of the main reclining mechanism and the rotation center of the side reclining mechanism are set such that positions of the bolster parts relative to the main part in a rotation radius direction are moved up as a reclining angle of each of the main part and the bolster parts increases.
7. The vehicle seat according to claim 4, wherein
   the position of the rotation center of the main reclining mechanism is lower than and behind the hip point of the seated occupant to be seated on the vehicle seat, and the position of the rotation center of the side reclining mechanism is lower than and behind the position of the rotation center of the main reclining mechanism.

* * * * *